United States Patent
Dasari et al.

(10) Patent No.: US 9,058,496 B1
(45) Date of Patent: Jun. 16, 2015

(54) SECURELY RECONFIGURING A MULTI-NODE SYSTEM TO PREVENT FIRMWARE ROLLBACK

(71) Applicant: International Business Machines Corporation, Armonk, NY (US)

(72) Inventors: Shiva R. Dasari, Austin, TX (US); Raghuswamyreddy Gundam, Austin, TX (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 50 days.

(21) Appl. No.: 14/146,757

(22) Filed: Jan. 3, 2014

Related U.S. Application Data (63) Continuation of application No. 14/146,068, filed on Jan. 2, 2014.

(51) Int. Cl.
  G06F 21/60 (2013.01)
  H04L 12/24 (2006.01)
  G06F 9/44 (2006.01)

(52) U.S. Cl.
  CPC ............ *G06F 21/60* (2013.01); *H04L 41/0813* (2013.01); *G06F 9/4416* (2013.01)

(58) Field of Classification Search
  CPC combination set(s) only.
  See application file for complete search history.

(56) References Cited

U.S. PATENT DOCUMENTS

| | | | |
|---|---|---|---|
| 5,918,066 A * | 6/1999 | Chuang-Sung et al. | 710/2 |
| 6,357,002 B1 * | 3/2002 | Lupo et al. | 713/1 |
| 6,711,736 B1 * | 3/2004 | Lo et al. | 717/168 |
| 7,797,693 B1 | 9/2010 | Gustafson et al. | |
| 8,874,892 B1 * | 10/2014 | Chan et al. | 713/2 |
| 2003/0076311 A1 * | 4/2003 | Lin et al. | 345/204 |
| 2003/0115444 A1 * | 6/2003 | Yang | 713/2 |
| 2003/0126511 A1 * | 7/2003 | Yang et al. | 714/39 |
| 2004/0015685 A1 * | 1/2004 | Chen et al. | 713/1 |
| 2012/0117555 A1 | 5/2012 | Banerjee et al. | |
| 2012/0185838 A1 | 7/2012 | Schwartzman et al. | |

OTHER PUBLICATIONS

Viswesvaran Janakiraman, "Storage Partitioning and Routing Scheme to Achieve Improved Multi-node De-duplication", Symantec Corporation, IP.com No. IPCOM000217034D, IP.com Electronic Publication: Apr. 27, 2012, 5 pages.

(Continued)

*Primary Examiner* — Beemnet Dada
(74) *Attorney, Agent, or Firm* — Katherine S. Brown; Jeffrey L. Streets (57) ABSTRACT

A method initiates boot of a multi-node system including a first compute node scaled together with a second compute node, wherein the multi-node system boots from a basic input output system of the first compute node that is identified as a primary node by a trusted platform module of the first compute node. The method further includes receiving a request to reconfigure the multi-node system so that the second compute node would become the primary node, and reconfiguring the multi-node system so that the second node is the primary mode only in response to a user manually asserting physical presence to a trusted platform module of the first compute node. A system provides compute nodes that each include a trusted platform module having first and second non-volatile indices for controlling the configuration of the multimode system.

3 Claims, 4 Drawing Sheets

(56) References Cited

OTHER PUBLICATIONS

Anonymous, "Use of a Storage Medium as a Communications Network for Liveness Determination in a High-Availability Cluster Containing Multiple Nodes", An IP.com Prior Art Database Technical Disclosure, IP.com No. IPCOM000223123D, IP.com Electronic Publication: Nov. 5, 2012, 8 pages.

Ranjit Noronha et al., "Using Programmable NICs for Time-Warp Optimization", Computer Science Deptartment State University of New York, Binghamton, NY, Proceedings of the International Parallel and Distributed Processing Symposium (IPDP'02), Computer Society, 8 pages. (This document only identifies the year of publication (without the month), but the year of publication is sufficiently earlier than the effective U.S. filing date and any foreign priority date so that the particular month of publication is not in issue. SEE MPEP 609.04(a)).

"TCG PC Client Specific TPM Interface Specification (TIS)", Version 1.2 Final Revision 1.00, Jul. 11, 2005, for TPM Family 1.2; Level 2, Trusted Computing Group, Incorporated, 70 pages.

* cited by examiner

SECURELY RECONFIGURING A MULTI-NODE SYSTEM TO PREVENT FIRMWARE ROLLBACK

CROSS-REFERENCE TO RELATED APPLICATIONS

This application is a continuation of U.S. patent application Ser. No. 14/146,068 filed on Jan. 2, 2014, which application is incorporated by reference herein.

BACKGROUND

1. Field of the Invention

The present invention relates to methods and systems for securely reconfiguring a multi-node system.

2. Background of the Related Art

Compute nodes may be scaled together and work together as a single multi-node system. The multi-node system boots using the basic input output system (BIOS) of only one of the compute nodes. Typically, the compute node having the most recent version of the BIOS is used to boot the multi-node system, and this compute node is referred to as the primary node. Other compute nodes within the multi-node system are referred to as secondary nodes.

Such a multi-node system may be subject to a malicious attack in which the attacker causes the multi-node system to boot from an old firmware version that contains known vulnerabilities. Such an effort to exploit the vulnerabilities of an older version of BIOS may be referred to as a "rollback attack." While a rollback attack may be attempted by merely replacing a newer version of the BIOS on the primary node with an older version of BIOS, there are known methods to prevent an unauthorized update of the BIOS code to an older version. However, a rollback attack on a multi-node system may also be carried out by reconfiguring a compute node having an older version of BIOS to serve as the primary node and a compute node having a newer version of BIOS to serve as a secondary node. During the next boot of the multi-node system, the system will then boot using the older version of BIOS rather than the newer version of BIOS.

BRIEF SUMMARY

One embodiment of the present invention provides a method comprising initiating boot of a multi-node system including a first compute node scaled together with a second compute node, wherein the multi-node system boots from a basic input output system of the first compute node that is identified as a primary node by a trusted platform module of the first compute node. The method further comprises receiving a request to reconfigure the multi-node system so that the second compute node would become the primary node, and reconfiguring the multi-node system so that the second node is the primary mode only in response to a user manually asserting physical presence to a trusted platform module of the first compute node.

Another embodiment of the present invention provides a system, comprising a first compute node and a second compute node scaled together to form a single multi-node system, wherein the first compute node defaults to a primary node and the second compute node defaults to a secondary node. Each of the first and second compute nodes includes a trusted platform module, an OR gate, and an AND gate. The trusted platform module has a first non-volatile index storing a codelevel and a second non-volatile index storing a physical presence override, wherein the codelevel indicates whether the other node has the same or greater version of basic input output system (BIOS), and the physical presence override indicates whether the other node is the primary node. The OR gate has a first input coupled to the first non-volatile index, a second input coupled to the second non-volatile index, and an output. The AND gate has a first input receiving a reconfiguration request signal from a firmware interface, a second input receiving the output of the OR gate, and an output identifying whether the first or second node should be the primary node. Accordingly, the output of the AND gate determines whether to boot the multi-node system from the BIOS of the first compute node or from the BIOS of the second compute node.

DETAILED DESCRIPTION

One embodiment of the present invention provides a method comprising initiating boot of a multi-node system including a first compute node scaled together with a second compute node, wherein the multi-node system boots from a basic input output system (BIOS) of the first compute node that is identified as a primary node by a trusted platform module of the first compute node. The method further comprises receiving a request to reconfigure the multi-node system so that the second compute node would become the primary node, and reconfiguring the multi-node system so that the second node is the primary mode only in response to a user manually asserting physical presence to a trusted platform module of the first compute node.

While the number of compute nodes in a multi-node system may vary, only one compute node may be the primary node. One of the compute nodes is preferably identified as a default primary node for the multi-node system. Either of the compute nodes may be made to be the primary node by submitting a reconfiguration request, such as by changing a node selection setting. By requiring a user to manually assert physical presence, an unauthorized attempt to reconfigure the multi-node system to boot from the second node is prevented, and an authorized reconfiguration of the multi-node system to boot from the second node is allowed.

In one option, the method may further include determining whether the BIOS of the first compute node is the same version as, or a more recent version than, the BIOS of the second compute node. Such a determination may include core root of trust for measurement (CRTM) code in the BIOS of the primary compute node comparing the version of the BIOS of the first compute node and the version of the BIOS of the second compute node.

In a further option, the method may further include, for the primary node, setting a first non-volatile index in the trusted platform module of the compute node to logical "1" if the secondary node has a BIOS version that is the same as or newer than the BIOS version of the primary node, or logical "0" if the secondary node has a BIOS version that is older than the BIOS version of the primary node. Where the determination is made by CRTM code, the CRTM code may be responsible for setting the value in the first non-volatile index. In parts of this disclosure, the first non-volatile index is referred to as "CodeLevel". The first non-volatile index (CodeLevel) in each of the computes nodes starts off with a value of logical "0". However, the CRTM of the primary node may set the value of the first non-volatile index to "1" under the conditions described above.

In a still further option, the method may further include, for each compute node, setting a second non-volatile index in the trusted platform module of the compute node to logical "0" if the compute node is the primary node of the multi-node system, or logical "1" if the compute node is not the primary node of the multi-node system. Optionally, the second non-volatile index in the trusted platform module of the primary node is set to logical "0" in response to powering off and power on the primary compute node. The second non-volatile index (PpOverride) in each of the compute nodes starts off with a value of logical "0". However, the value of the second non-volatile index may be set to "1" in a compute node that is not the primary node.

One of the first and second compute nodes is preferably identified as a default primary node for the multi-node system. The first and second non-volatile indices of the default primary node may both initially set to "0", wherein the value of the first or second non-volatile index cannot be updated without asserting physical presence to the trusted platform module. These features assure that the compute node identified as the primary node will have its BIOS used during the boot of the multi-node system, unless an authorized user has reconfigured the multi-node system to cause the other compute node to become the primary node.

In another embodiment, the method further includes prompting a user to manually assert physical presence to the trusted platform module of the compute node serving as the primary node in response to receiving the request to reconfigure the multi-node system. As one example, the request to reconfigure the multi-node system may be received from the integrated management module of the primary node, perhaps accordingly to a user changing a node selection setting.

Such a prompt may, for example, involve putting a message on a display or generating an audible noise or instruction to a user. Following the prompt, if the manual assertion of physical presence is received, then the method may set the second non-volatile index in the trusted platform module of the primary node to logical "1". When the second non-volatile index, optionally referred to as PpOverride, (in the TPM of one compute node) has the value of "1", this indicates that the other compute node is the primary node. If no assertion of physical presence is received following the prompt, then the requested reconfiguration of the multi-node system is prevented and the logical value of the second non-volatile index in the trusted platform module of the compute is maintained at "0".

In a still further embodiment, the multi-node system is reset (powered off and then powered back on) in response to receiving a manual assertion of physical presence to the trusted platform module of the primary node after prompting the user to manually assert physical presence to the trusted platform module of the primary node.

Another embodiment of the present invention provides a system, comprising a first compute node and a second compute node scaled together to form a single multi-node system, wherein the first compute node defaults to a primary node and the second compute node defaults to a secondary node. Each of the first and second compute nodes includes a trusted platform module, an OR gate, and an AND gate. The trusted platform module has a first non-volatile index storing a codelevel and a second non-volatile index storing a physical presence override, wherein the codelevel indicates whether the other node has the same or greater version of basic input output system (BIOS), and the physical presence override indicates whether the other node is the primary node. The OR gate has a first input coupled to the first non-volatile index, a second input coupled to the second non-volatile index, and an output. The AND gate has a first input receiving a reconfiguration request signal from a firmware interface, a second input receiving the output of the OR gate, and an output identifying whether the first or second node should be the primary node. Accordingly, the output of the AND gate determines whether to boot the multi-node system from the BIOS of the first compute node or from the BIOS of the second compute node.

In various embodiment of the system, neither of the first and second non-volatile indexes may be changed without a user manually asserting physical presence to the trusted platform module. In one option, the system may further comprise each of the first and second compute nodes including a field programmable gate array for selectively pointing to the BIOS of the compute node that is the primary node.

A Trusted Platform Module (TPM) is a microcontroller that may store keys, passwords and digital certificates. A TPM is typically installed on the motherboard of a computer or any computing device that may require these functions. This microcontroller may be used to ensure that the information stored on the computer is made more secure from external software attack and physical theft. Security processes, such as digital signature and key exchange, may be protected through by the TPM. For example, the TPM may deny access to data and secrets in a platform if the boot sequence is not as expected. Critical applications and capabilities such as secure email, secure web access and local protection of data are thereby made much more secure.

Embodiments of the present invention securely detect the level of code in the secondary node, prevent unauthorized attempts to reconfigure the secondary node (with older level of firmware) as the primary node, and provides the ability for an authorized user to securely reconfigure the secondary node as primary. This is achieved using a combination of Trusted Platform Module (TPM), Physical Presence (PP), trusted code (e.g. CRTM—Core Root of Trust for Measurement) and associated hardware which controls the primary and secondary node switching.

Embodiments of the present invention may be used to prevent rollback attack performed using multi-node reconfiguration which does not require any updates to the code and relies on the existence of older level of code in the secondary node. A rollback attack can be directed at the IMM on a particular compute node when connected to a network for the purpose managing the compute node or server. Alternatively, a rollback attack can may be directed at a host operating system running on the multi-node system. Both of these avenues for a rollback attack primarily originate over a network. However, a rollback attack is only successful if the attacker can manage to change the FPGA settings or implement a change in IMM settings to reconfigure the multi-node system. The system and method of the present invention prevent any unauthorized attempts to reconfigure a multi-node system to make secondary node as primary.

One embodiment of the present invention provides a computer program product including computer readable program code embodied on a computer readable storage medium. The computer program product comprises computer readable program code for initiating boot of a multi-node system including a first compute node scaled together with a second compute node, wherein the multi-node system boots from a basic input output system of the first compute node that is identified as a primary node by a trusted platform module of the first compute node. The computer program product further comprises computer readable program code for receiving a request to reconfigure the multi-node system so that the second compute node would become the primary node; and computer readable program code for reconfiguring the multi-node system so that the second node is the primary mode only in response to a user manually asserting physical presence to a trusted platform module of the first compute node.

The foregoing computer program products may further include computer readable program code for implementing or initiating any one or more aspects of the methods described herein. Accordingly, a separate description of the methods will not be duplicated in the context of a computer program product.

Figure 1:
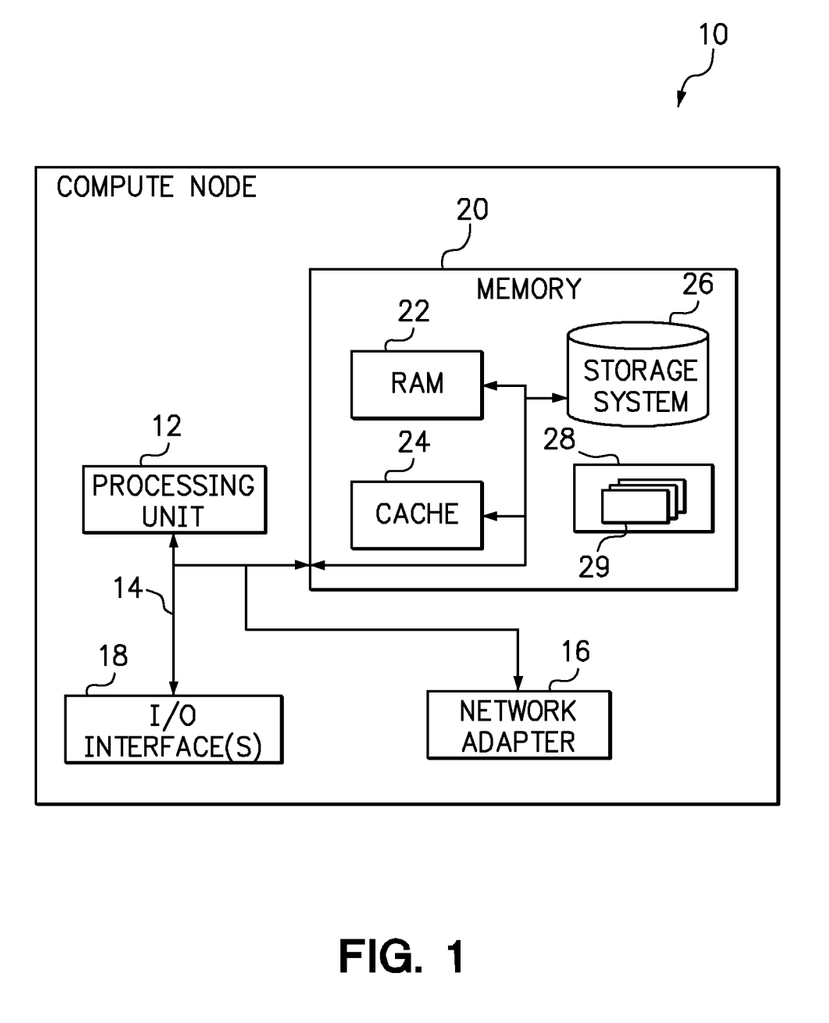
FIG. 1 is a block diagram of a generic compute node.

FIG. 1 is a schematic diagram of a generic compute node 10 that provides one non-limiting example of a compute node that may be used in accordance with one or more embodiment of the present invention. The components of compute node 10 may include, but are not limited to, one or more processors or processing units 12, a system memory 20, and a bus 14 that couples various system components including system memory 20 to the processing unit 12. The bus 14 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The compute node 10 typically includes a variety of computer system readable media. Such media may be any available media that is accessible by the compute node 10, and it includes both volatile and non-volatile media, removable and non-removable media.

The system memory 20 can include computer system readable media in the form of volatile memory, such as random access memory (RAM) 22 and/or cache memory 24. The compute node 10 may further include other removable/non-removable, volatile/non-volatile computer system storage media. By way of example only, a storage system 26 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to a bus 14 by one or more data media interfaces. As will be further depicted and described below, the memory 20 may include at least one computer program product having a set (e.g., at least one) of program modules that are configured to carry out the functions of embodiments of the invention.

Program/utility 28, having a set (at least one) of program modules 29, may be stored in memory 20 by way of example, and not limitation, as well as an operating system, one or more application programs, other program modules, and program data. Each of the operating system, one or more application programs, other program modules, and program data or some combination thereof, may include an implementation of a networking environment. The program modules 29 generally carry out the functions and/or methodologies of embodiments of the invention as described herein.

The compute node 10 may also communicate with one or more external devices 14 such as a keyboard, a pointing device, a display, or one or more other devices that enable a user to interact with the compute node 10. The compute node 10 may also include other devices, such as a network card or modem that enable the compute node 10 to communicate with one or more other computing devices. Such communication can occur via Input/Output (I/O) interfaces 18. Still yet, the compute node 10 can communicate with one or more networks such as a local area network (LAN), a general wide area network (WAN), and/or a public network (e.g., the Internet) via a network adapter 16. As depicted, the network adapter 16 communicates with the other components of the compute node 10 via the bus 14. It should be understood that although not shown, other hardware and/or software components could be used in conjunction with the compute node 10. Examples, include, but are not limited to: microcode, device drivers, redundant processing units, external disk drive arrays, RAID systems, tape drives, and data archival storage systems, etc.

Figure 2:
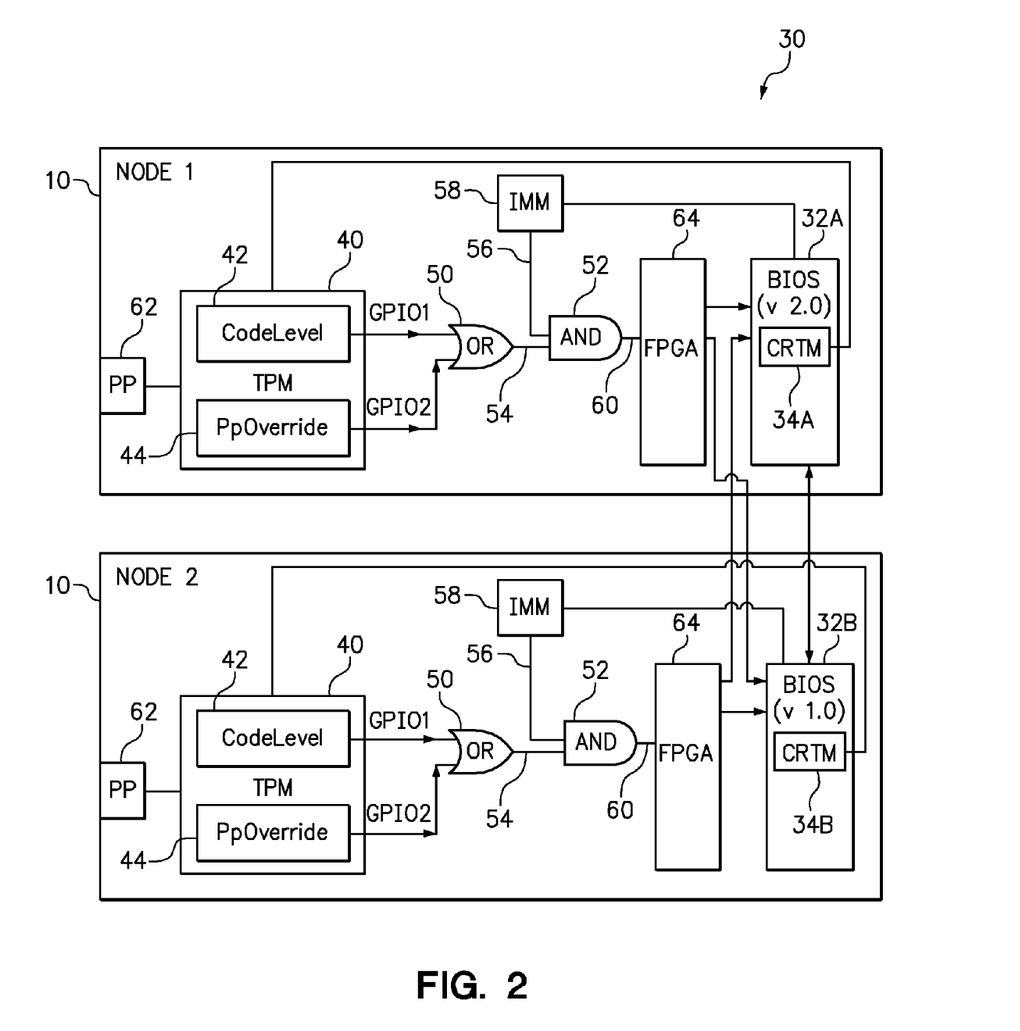
FIG. 2 is a block diagram of two compute nodes forming a single multi-node system.

FIG. 2 is a block diagram of two compute nodes 10 forming a single multi-node system 30. Many of the components of the compute nodes 10, such as those shown in FIG. 1, are not shown in FIG. 2 in order to highlight components that implement an embodiment of the invention. It should be recognized that the two compute nodes 10 may have identical hardware and perhaps also identical firmware and software. For purposes of illustration, the upper or first compute node (NODE 1) has a BIOS 32A Version 2.0, whereas the lower or second compute node (NODE 2) has a BIOS 32B Version 1.0, where Version 2.0 is more recent than Version 1.0.

The first compute node and a second compute node are scaled together to form a single multi-node system. The first compute node defaults to a primary node and the second compute node defaults to a secondary node. However, through authorized reconfigurations, the second compute node may serve as the primary node and the first compute node may serve as a secondary node. Only one compute node may be the primary node at any one point in time.

Each of the first and second compute nodes 10 includes a trusted platform module 40, an OR gate 50, and an AND gate 52. The trusted platform module 40 has a first non-volatile index 42 storing a codelevel logical value and a second non-volatile index 44 storing a physical presence override logical value, wherein the codelevel 42 indicates whether the other node has the same or greater version of basic input output system (BIOS) 32, and the physical presence override 44 indicates whether the other node is the primary node. The OR gate 50 has a first input coupled to the first non-volatile index 42, a second input coupled to the second non-volatile index 44, and an output 54. The AND gate 52 has a first input 56 receiving a reconfiguration request signal from a firmware interface 58 (such as an integrate management module), a second input receiving the output 54 of the OR gate 50, and an output 60 identifying whether the first or second node should be the primary node. Accordingly, the output 60 of the AND gate 52 determines whether to boot the multi-node system 30 from the BIOS 32A of the first compute node (NODE 1) or from the BIOS 32B of the second compute node (NODE 2).

In various embodiment of the system, neither of the first and second non-volatile indexes 42, 44 may be changed without a user manually asserting physical presence to the trusted platform module 40, such as by pushing the physical presence (PP) button or switch 62 that may be position of the front panel of each compute node. PP 62 is input to the TPM 40, such that manual assertion of PP allows the IMM to set the PpOverride bit whose status is reflected on GPIO2.

In one option, the system may further comprise each of the first and second compute nodes including a field programmable gate array (FPGA) 64 for selectively pointing to the BIOS of the compute node that is the primary node. The FPGA 64 receives the output 60 from the AND gate 52 as its instruction as to whether the two compute nodes 10 should use the BIOS 32A of the first compute node (NODE 1) or from the BIOS 32B of the second compute node (NODE 2).

All of the compute nodes in the multi-node system may have identical hardware. When the user selects one of the compute nodes as the primary, all other nodes become secondary. The compute node that is currently identified as the primary node is the one from which BIOS code is executed when the multi-node system 30 is started. Accordingly, CPUs in the primary node as well as all secondary nodes run code from the BIOS flash chip located on the primary node. The Core Root of Trust for Measurement (CRTM) code 34A, 34B is the initial part of the BIOS 32A, 32B with special security properties. Since every compute node 10 in the multi-node system 30 boots using the BIOS of the primary node, only the CRTM on the primary node will be used during any one boot. Whenever a secondary node is configured as the primary node, BIOS code from this newly configured primary node is executed during the next boot. Embodiments of the present invention prevent a rollback attack in which a malicious entity attempts to switch a secondary node (with older level of BIOS on it) to become the primary node.

Figure 3:
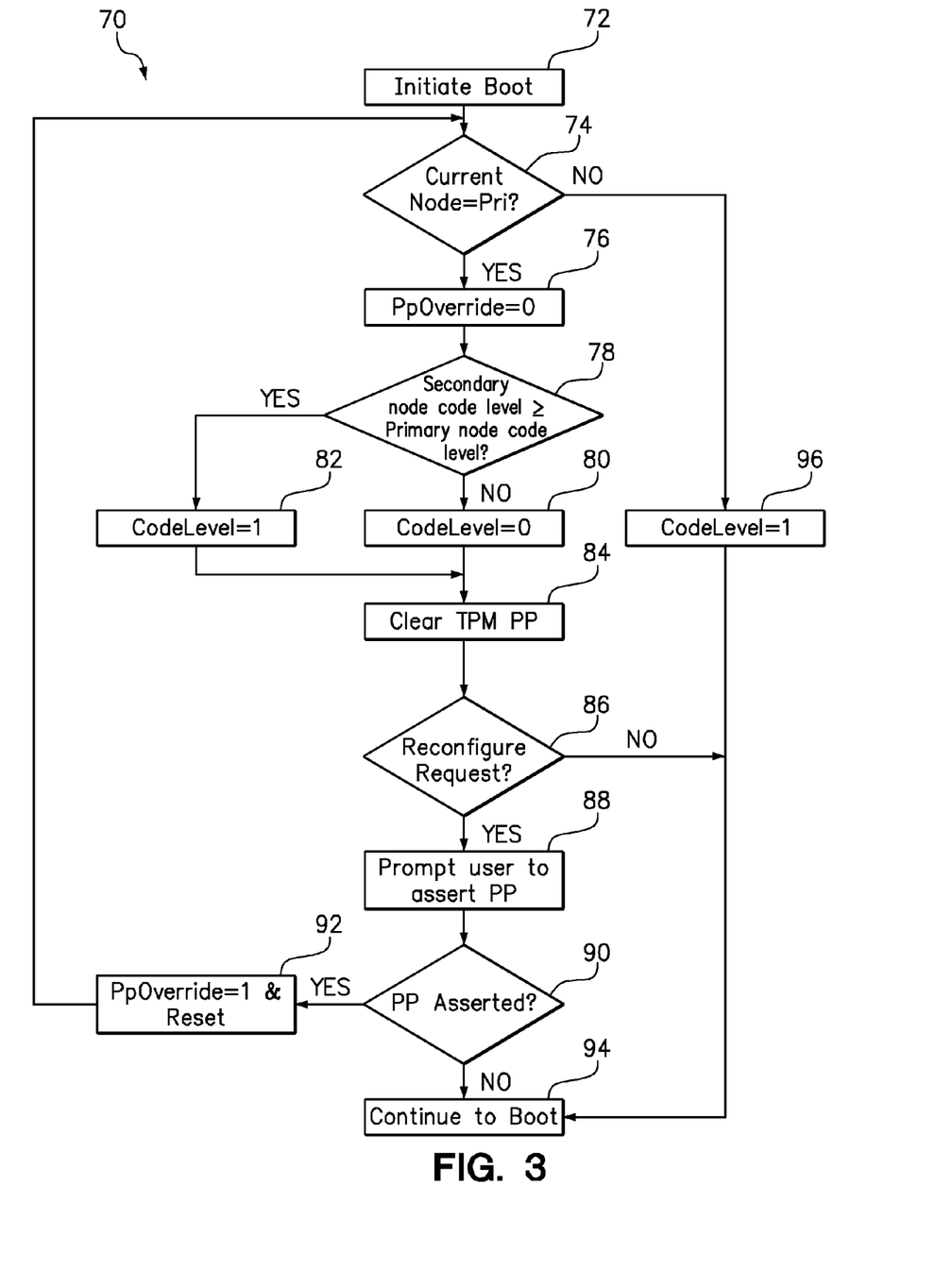
FIG. 3 is a flowchart of a method in accordance with one embodiment of the present invention.

FIG. 3 is a flowchart of a method 70 in accordance with one embodiment of the present invention. In step 72, boot of a multi-node system is initiated, perhaps by turning on power to the multi-node system. In step 74, the method determines whether the current node is the primary node. This step may involve the CRTM code reading the user settings in the IMM to determine whether the node has been identified as the primary node. If the current node is the primary node, then step 76 sets the second non-volatile index "PpOverride" to a logical "0". A PpOverride value of "0" means that a node reconfiguration override is not authorized. If the current node is not the primary node, then step 96 sets the second non-volatile index "PpOverride" to a logical "1" before continuing to boot in step 94.

In step 78, the CTRM code determines whether the secondary node has a BIOS code level or version that is the same as, or newer than, the BIOS code level or version of the primary node. If this is a positive determination, then step 82 sets the CodeLevel value in the first non-volatile index of the TPM to a logical "1". If step 78 leads to a negative determination, then step 80 sets the CodeLevel value in the first non-volatile index of the TPM to a logical "0". A CodeLevel value of "0" means that the BIOS code in the secondary node is older than the BIOS code in the primary node. Step 84 then clears the physical presence assertion to the TPM (i.e., TPM PP), so that any previous assertion of PP does not get mistakenly reused for an unauthorized reconfiguration.

Step 86 determines whether a "reconfigure secondary node as primary node" operation has been requested, such as by a user changing a node selection setting in the IMM which controls the node. If not, then the method continues to boot at step 94. However, if a reconfiguration request was received, then step 88 prompts the user to manually assert PP. If a manual assertion of PP is detected in step 90, then step 92 causes the value of PpOverride in that node to be changed to a logical "1" and resets the multi-node system (powering off and powering back on). The method then returns to step 74. However, if a manual assertion of PP is not detected in step 90, then step 94 continues to boot the system.

According to the method 70, asserting Physical Presence in step 90 allows the CRTM code to update the "PPOverride" Index of the primary node to a value of logical "1" in order to securely authorize reconfiguration of secondary node as primary node (allows user 'reconfigure secondary node as primary node' selection to go thru) and resets the system. During the next boot, the multi-node system will boot from the second node (i.e., the original secondary node, which is now the current primary node) since the user has securely authorized the reconfiguration of secondary node as primary node. In other words, an authorized rollback to an older level of BIOS code in the secondary node by reconfiguring the secondary node as primary is detected and allowed securely. However, if a user doesn't assert Physical Presence in step 90, then the CRTM code continues to boot from the primary node in step 94 and the value of "PpOverride" is unchanged such that the next boot will still use the BIOS from the first compute node (primary current). Accordingly, the attempted unauthorized rollback to an older level of code in the secondary node, by reconfiguring the secondary node as primary, is detected and prevented.

Figure 4:
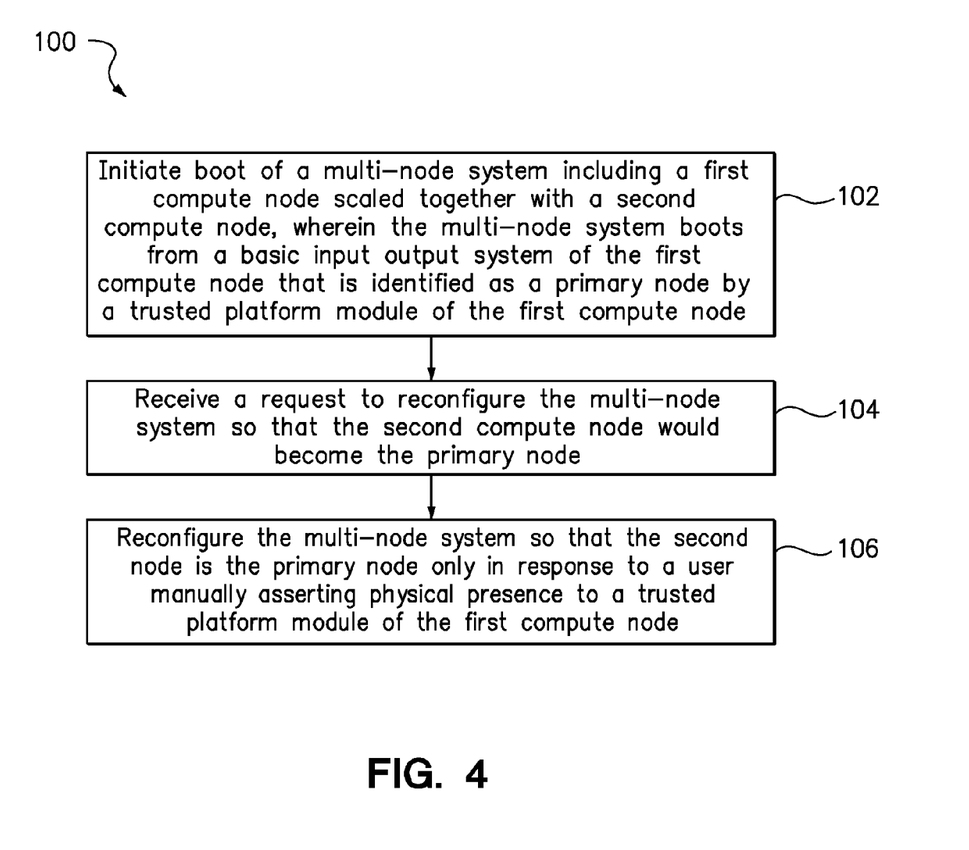
FIG. 4 is a flowchart of a method in accordance with one embodiment of the present invention.

FIG. 4 is a flowchart of a method 100 in accordance with one embodiment of the present invention. In step 102, the method initiates boot of a multi-node system including a first compute node scaled together with a second compute node, wherein the multi-node system boots from a basic input output system of the first compute node that is identified as a primary node by a trusted platform module of the first compute node. In step 104, the method receives a request to reconfigure the multi-node system so that the second compute node would become the primary node. In step 106, the multi-node system is reconfigured so that the second node is the primary mode only in response to a user manually asserting physical presence to a trusted platform module of the first compute node.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
 a first compute node and a second compute node scaled together to form a single multi-node system, wherein the first compute node defaults to a primary node and the a second compute node defaults to a secondary node;
 each of the first and second compute nodes including:
  a trusted platform module having a first non-volatile index storing a codelevel and a second non-volatile index storing a physical presence override, wherein the codelevel indicates whether the other node has the same or greater version of basic input output system (BIOS), and the physical presence override indicates whether the other node is the primary node;
  an OR gate having a first input coupled to the first non-volatile index, a second input coupled to the second non-volatile index, and an output; and
  an AND gate having a first input receiving a reconfiguration request signal from a firmware interface, a second input receiving the output of the OR gate, and an output identifying whether the first or second node should be the primary node;

wherein the output of the AND gate determines whether to boot the multi-node system from the BIOS of the first compute node or from the BIOS of the second compute node.

2. The system of claim 1, wherein neither of the first and second non-volatile indexes may be changed without a user manually asserting physical presence to the trusted platform module.

3. The system of claim 2, further comprising:
each of the first and second compute nodes further including a field programmable gate array for selectively pointing to the BIOS of the compute node that is the primary node.

\* \* \* \* \*